(12) United States Patent
Vezzosi et al.

(10) Patent No.: US 7,644,739 B1
(45) Date of Patent: Jan. 12, 2010

(54) PRESSURIZED ACTUATION SYSTEM FOR INFLATABLE STRUCTURES

(75) Inventors: Jonathan Vezzosi, Toms River, NJ (US); Thomas W. Swierkocki, Manasquan, NJ (US)

(73) Assignee: Air Cruisers Company, Wall, NJ (US)

( * ) Notice: Subject to any disclaimer, the term of this patent is extended or adjusted under 35 U.S.C. 154(b) by 511 days.

(21) Appl. No.: 11/712,121

(22) Filed: Feb. 28, 2007

Related U.S. Application Data

(63) Continuation-in-part of application No. 11/002,859, filed on Dec. 2, 2004, now Pat. No. 7,434,600.

(51) Int. Cl.
*B65B 1/08* (2006.01)

(52) U.S. Cl. .............................. 141/67; 141/46; 141/54; 141/99; 280/736

(58) Field of Classification Search ...................... 141/4, 141/9, 10, 19, 25, 46, 54, 67, 99, 114, 237; 441/81; 244/137.1, 905; 280/736
See application file for complete search history.

(56) References Cited

U.S. PATENT DOCUMENTS

| | | | |
|---|---|---|---|
| 3,203,352 A | 8/1965 | Schafranek | |
| 3,463,287 A | 8/1969 | Smith | |
| 3,621,383 A | 11/1971 | Rush | |
| 3,815,849 A | 6/1974 | Meston | |
| 3,840,057 A | 10/1974 | Lesh | |
| 3,910,532 A | 10/1975 | Fischer | |
| 4,104,964 A | 8/1978 | Larkworthy et al. | |
| 4,375,877 A | 3/1983 | Shorey | |
| 4,457,730 A | 7/1984 | Foster et al. | |
| 4,460,343 A | 7/1984 | Heimovics, Jr. et al. | |
| 4,512,539 A | 4/1985 | Ackermann et al. | |
| 4,566,862 A | 1/1986 | Halavais | |
| 4,567,977 A | 2/1986 | Fisher | |
| 4,577,817 A | 3/1986 | Hernandez | |
| 4,666,413 A | 5/1987 | Klein et al. | |
| 5,150,767 A | 9/1992 | Miller | |
| 5,161,754 A | 11/1992 | Duggal | |
| 5,284,453 A | 2/1994 | Kun | |
| 5,586,615 A | 12/1996 | Hammer et al. | |
| 5,806,572 A | 9/1998 | Voller | |
| 5,871,180 A | 2/1999 | Hublikar | |
| 5,875,868 A | 3/1999 | Smialowicz et al. | |
| 5,975,467 A | 11/1999 | O'Donnell et al. | |
| 5,988,438 A | 11/1999 | Lewis et al. | |
| 6,298,970 B1 | 10/2001 | Targiroff et al. | |
| 6,644,596 B1 | 11/2003 | Juralina et al. | |
| 6,709,305 B2 | 3/2004 | Parrott et al. | |
| 7,128,629 B2 | 10/2006 | Summers | |
| 7,434,600 B1 | 10/2008 | Swierkocki et al. | |

*Primary Examiner*—Timothy L Maust

(57) ABSTRACT

A pressurized actuator system for independent deployment of at least two inflatable structures having a first primary section adapted for deployment of a primary inflatable structure and second section for deployment of a secondary inflatable structure and an auxiliary source of pressurized fluid for operating said device. A control assembly for controlling a flow of pressurized fluid from the auxiliary source of pressurized into the second system is provided. Thus, the system assures independent deployment of the primary and secondary inflatable structures.

20 Claims, 8 Drawing Sheets

PRESSURIZED ACTUATION SYSTEM FOR INFLATABLE STRUCTURES

This Application is a continuation-in-part Application for patent application Ser. No. 11/002,859 filed Dec. 2, 2004 of U.S. Pat. No. 7,434,600 filed Dec. 2, 2004.

BACKGROUND OF THE INVENTION

This invention relates to the deployment of inflatable structures, and more particularly to a pressurized actuator system that utilizes pneumatic or hydraulic force for initiating the reliable rapid deployment of inflatable structures.

Certain types of aircraft, such as commercial fixed wing aircraft and rotorcraft such as for example, helicopters, are required by the regulatory agencies to carry inflatable flotation devices for passenger safety in the event of an emergency situation over water. Fixed wing commercial aircraft, for example, typically include one or more inflatable slides that are normally stored uninflated in a container mounted on the interior of the aircraft door or immediately adjacent thereto.

In military applications, inflatable life rafts and their inflation systems are sometimes located in external compartments of the aircraft in order to maximize space in the fuselage for transporting equipment, supplies and personnel. Multiple life rafts and their inflation systems may be located in the external compartments. In the prior art the inflation system for each life raft includes a container of pressurized gas with an inflation valve that can be actuated from a remote location, such as the cockpit, by mechanical means which may be in the form of a cable and pulley system routed through the aircraft. When a pull handle or similar device associated with the system is activated, the valve is opened and the pressurized gas is discharged from the container and into the life raft causing its rapid inflation. Some of such inflation systems employ a secondary applied force for discharging a secondary pressurized fluid to indirectly activate the primary inflating system. An example of such systems has been disclosed in U.S. Pat. No. 6,644,596. It should be noted however that such prior art deployment systems are typically adapted for deployment of a single inflatable structure and not necessarily concentrated on controlled and/or independent deployment of emergency evacuation floats and associated life rafts.

Mechanical inflation systems for rotorcrafts have also been employed in order to enable the rotorcraft to land on water in an emergency situation, such as when the rotorcraft loses power. Such systems provide passengers with extra crucial time to escape before the rotorcraft sinks. The inflation system typically includes multiple emergency flotation devices mounted to the rotorcraft landing gear, a container of pressurized gas for each flotation device, an inflation valve associated with the pressurized container, and a mechanical system routed through the helicopter for actuating the inflation valves. Thus, great care must be taken to ensure that the cables are properly sized, sufficiently taut, lubricated, and in good working order so that the flotation devices may be simultaneously deployed.

Although other systems or mechanisms can be used for deploying the flotation devices and life rafts, they have their own disadvantages. By way of example, an electrical system might employ a solenoid valve that is actuated upon supplying a voltage. Likewise, a pyrotechnic mechanism uses an explosive charge inside the valve for its activation. However, when an emergency landing situation occurs due to a loss of rotorcraft power, the emergency flotation devices may not be deployed since there may not be enough electrical current to actuate the solenoid valve or set off the explosive charge.

For the rotorcrafts such as helicopters that fly missions over water it is required to carry emergency primary inflatable devices such as floats and secondary inflatable devices, life rafts for example, to allow passengers to egress after a water ditching or landing. Typically, the inflatable floats are mounted to the skids or fuselage of the rotorcraft and are designed to keep the aircraft afloat on the water. The inflatable rafts can be stowed inside the cabin or mounted to the fuselage exterior. Prior to the water landing, the pilot activates the inflatable floats by pulling a handle, lever or similar activation means. Before exiting the rotorcraft, the crew must locate and remove the inflatable rafts. After exiting the aircraft, the inflatable rafts are inflated using another activation device.

When mounted externally, it is advantageous to remotely activate such inflatables. Along with remote mounting comes a possibility of inadvertent deployment of the life rafts either during flight or during ground maintenance. If the raft inflates in flight, it may become entangled in the main or tail rotors and cause the pilot to lose control of the rotorcraft ending in loss of life. On the other hand, inadvertently, activation of the inflatable could cause serious injury to unsuspecting maintenance personnel.

Thus, there is a long felt need for a deployment system having an inherent safety feature, so that the secondary inflatable or the life raft can be activated only after the primary inflatable or float has been deployed. There is further need for the deployment system eliminating the chance of the life raft being inadvertently deployed either in-flight or during ground maintenance operations. It would be further desirous to provide an actuator system that ensures the independent and controlled deployment of the flotation devices and life rafts.

BRIEF SUMMARY OF THE INVENTION

One aspect of the present invention provides a pressurized actuator system for deploying at least one inflatable structure. The system includes a primary source of pressurized fluid adapted for deploying an inflatable structure, a primary valve operatively associated with the primary container, a pressure-responsive primary transducer operative to open the primary valve, and a secondary source of pressurized fluid adapted for operating the primary transducer to thereby open the primary valve and deploy the at least one inflatable structure.

Another aspect of the present invention provides a pressurized actuator system for simultaneously deploying a plurality of inflatable structures. The system includes a plurality of primary sources of pressurized fluid adapted for deploying a plurality of inflatable structures, a plurality of primary valves that are operatively associated with different primary sources of pressurized fluid, a plurality of pressure-responsive primary transducers operative to open their respective primary valves, and a secondary source of pressurized fluid adapted for simultaneously operating the primary transducers to thereby open the primary valves and simultaneously deploy the plurality of inflatable structures.

BRIEF DESCRIPTION OF THE DRAWINGS

The foregoing summary as well as the following detailed description of the preferred embodiments of the present invention will be best understood when considered in conjunction with the accompanying drawings, wherein like designations denote like elements throughout the drawings, and wherein:

FIG. 7 is an enlarged view of a deployment portion of the pressurized actuator system of FIG. 6;

It is noted that the drawings are intended to depict only typical embodiments of the invention and therefore should not be considered as limiting the scope thereof. It is further noted that the drawings are not necessarily to scale. The invention will now be described in greater detail with reference to the accompanying drawings.

DETAILED DESCRIPTION OF THE INVENTION

Figure 4:
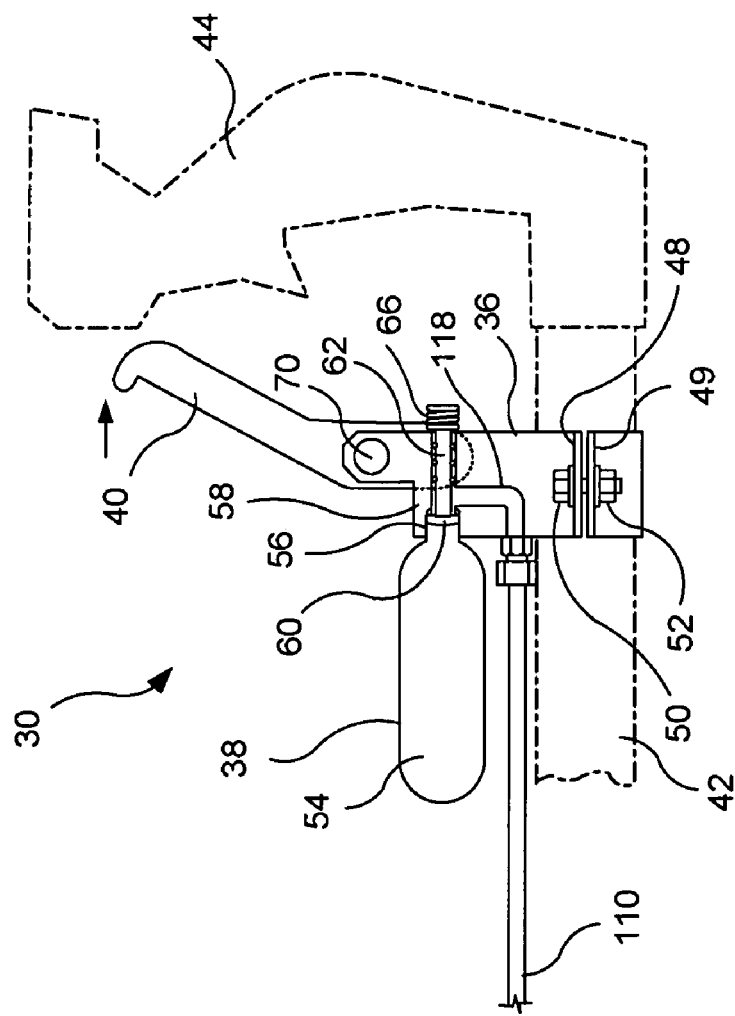
FIG. 4 is a side elevational view of a manual actuator portion of the pressurized actuator system of FIG. 3 in an actuated position.

With additional reference to FIG. 4, the actuator portion 30 preferably includes a base member 36, a secondary pressurized fluid source 38 mounted to the base member, and a secondary actuator in the form of an actuator arm or lever 40 movably or pivotally mounted to the base structure for accessing the pressurized fluid source.

In one embodiment of the invention, the base structure 36 has oppositely extending upper flanges 48 (only one shown) that abut with oppositely extending lower flanges 49 (only one shown) of a lower bracket portion 46 for mounting the base member 36 to a support 42 (shown in phantom line) of a rotorcraft control arm 44 (also shown in phantom line). A threaded fastener or bolt 50 extends through each of the lower and upper flanges and a threaded nut 52 secures the base structure 36 to the lower bracket portion 46 to thereby securely mount the base member onto the support 42. With the base structure 36 mounted near the control arm 44, a user can quickly access the arm 40 for deploying the inflatable flotation devices 24, 26 in the event of an emergency where quick response time may be crucial. The extra leverage provided by the control arm 44 permits a user to squeeze the actuator arm 40, thereby facilitating actuation of the actuator portion 30. It will be understood, however, that the base structure 36 can be mounted at other locations and/or with different mounting means arrangement utilizing any conventional type of fasteners or bracket arrangements, welding, and so on.

The secondary pressurized fluid source 38 preferably comprises a secondary container 54 with a neck portion 56 that is mounted in a bore 58 of the base structure 36 through well-known mounting means (not shown), such as cooperating threads, welding, brackets, and so on. A cap 60 (shown in hidden line) is positioned in the neck portion 56 for sealing the contents of the container 54. Preferably, the container 54 is charged with a compressed fluid, such as CO2, to approximately 900 psi at room temperature, or Nitrogen to approximately 1500 psi. However, it will be understood that virtually any fluid that is capable of storing energy can be used for this purpose, such as regular air, helium, hydraulic fluid, and so on. It will be further understood that the particular pressure in the container 54 can greatly vary depending on the type of fluid used and the forces required to activate one or more of the deployment portions 32A, 32B and inflatable flotation devices and life rafts associated therewith.

A puncture shaft 62 is mounted for sliding movement in the bore 58 and includes a tip 64 that extends toward the cap 60. The tip 64 is adapted to puncture the cap 60 when the actuator arm 40 is pressed toward the control arm 44, as shown in FIG. 4. A compression spring 66 is mounted between the base structure 36 and the shaft 62 for normally biasing the tip 64 away from the cap 60. A plurality of O-rings 68 are positioned around the shaft within the bore 58 for guiding the movement of the shaft and sealing the bore 58 after the cap 60 has been pierced. It will be understood that more or less O-rings may be provided. It should be also clear that utilization of any other conventional sealing arrangement is within the scope of the invention.

The actuator lever or arm 40 is pivotally connected to the base structure 36 through a pivot pin 70. A removable safety pin 72 locks the actuator arm or lever 40 against movement with respect to the base member 36 to prevent inadvertent actuation of the actuator system 12 while the rotorcraft is grounded. A shear pin or rivet 74 is located in the base member 36 to prevent inadvertent movement of the actuator lever or arm 40 during flight. With this arrangement, the shear pin 74 must be broken before the system can be activated. Preferably, the geometry of the actuator lever and shear pin are arranged so that a force of approximately 15 to 20 pounds applied to the actuator lever is required to shear the pin and move the lever. In this manner, inadvertent deployment of the flotation devices is prevented during rotorcraft operation. It will be understood that the shear pin 74 and/or the actuator lever 40 can be arranged to accommodate greater or lesser applied forces. It will be appreciated that other safety means can be used for preventing inadvertent actuation of the actuator system 12, such as springs, pistons, and so on, connected between the actuator lever 40 and control arm 44 or other structure.

Figure 3:
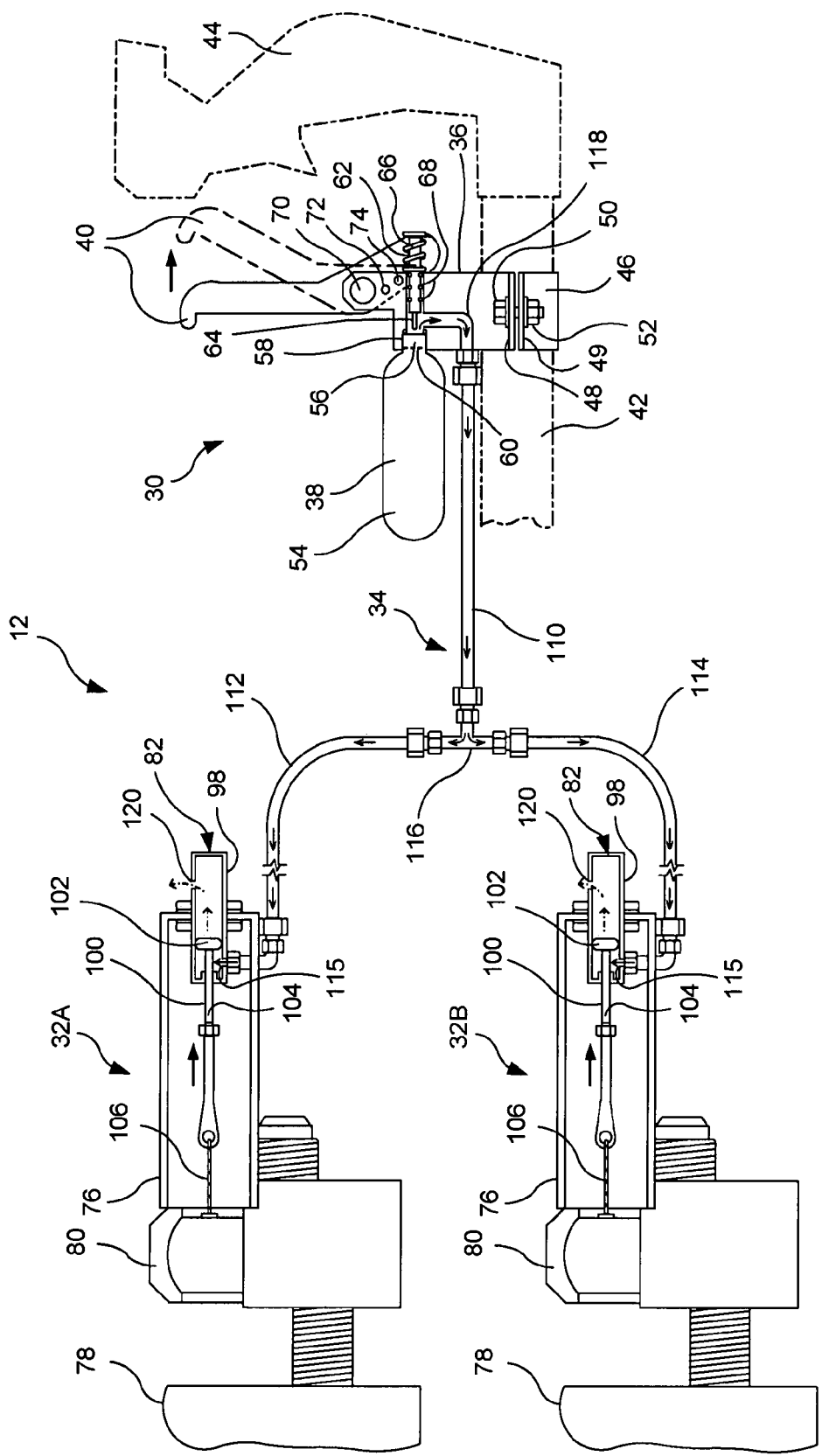
FIG. 3 is a schematic view of the pressurized actuator system in accordance with one embodiment of the present invention.
Figure 5:
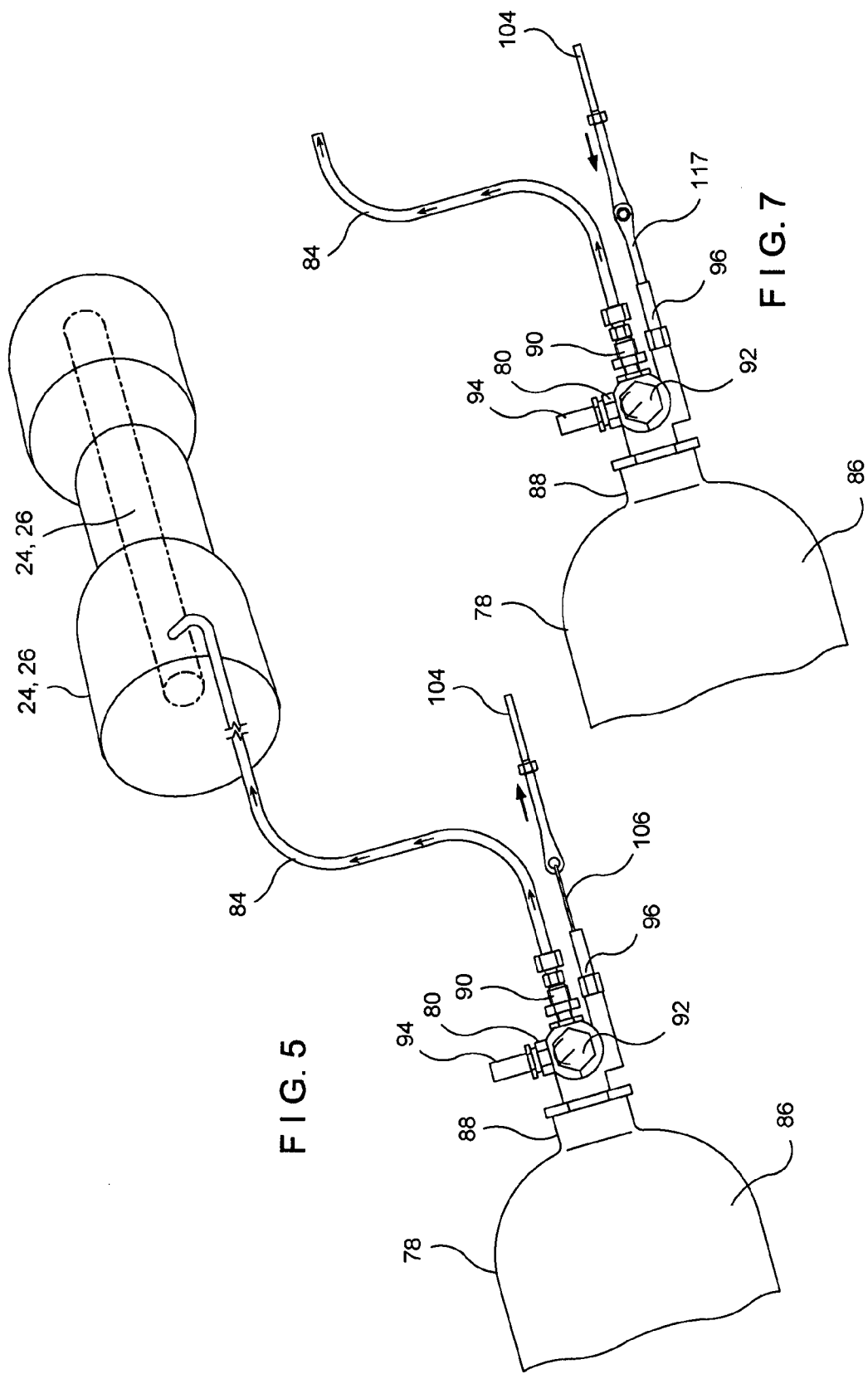
FIG. 5 is an enlarged view of a deployment portion of the pressurized actuator system of FIG. 3.

With reference now to FIGS. 3 and 5, the deployment portions 32A and 32B are preferably identical in construction and each preferably includes a base member 76, a primary pressurized fluid source 78 with a primary valve 80 mounted to the base member 76, a pressure-responsive primary transducer 82 connected to the base member 76 and the primary valve 80, and a deployment conduit 84 fluidly connected to the primary fluid source 78 and one of the flotation devices 24, 26.

As best shown in FIG. 5, the primary pressurized fluid source 78 preferably comprises a primary container 86 with a neck portion 88 that mounts the primary valve 80. The primary valve 80 is of conventional construction and includes a primary nozzle 90 connected to the deployment conduit 84 for discharging fluid under pressure from the primary container 86 to one of the flotation devices 24, 26. A pressure gauge 92 is provided on the primary valve 80 for displaying the fluid pressure inside the primary container 86. The primary valve 80 also includes a fill port 94 for charging the primary container 86 with fluid and a primary valve actuator 96 that can be manipulated for opening the primary valve 80 and discharging the pressurized fluid from the primary container 86 into the flotation device through the primary nozzle 90.

As shown in FIG. 3, the primary transducer 82 is preferably a linear actuator and includes a hollow cylinder 98 mounted to the base member 76 and a piston 100 slidably mounted in the cylinder 98. The piston 100 has a head 102 that is positioned in the cylinder and a shaft 104 that extends from the head 102 and out of the cylinder. A link arm 106 is connected between the shaft 104 and the primary valve actuator 96 (FIG. 5) for opening the primary valve when the piston 100 moves in the cylinder 98. Preferably, the link arm is in the form of a lanyard, cable or other flexible member.

In one embodiment of the invention, the tubing system 34 includes a first tubing section 110 connected to both a second tubing section 112 and a third tubing section 114 through a T-connector 116. The first tubing section 110 is connected to the base member 36 of the actuator portion 30 and is in fluid communication with a second bore 118 formed in the base member 36, which is in turn in fluid communication with the first bore 58. The second tubing section 112 extends between the T-connector 116 and the cylinder 98 of the primary transducer 82 of the deployment portion 32A. Likewise, the third tubing section 114 extends between the T-connector 116 and the cylinder 98 of the primary transducer 82 of the deployment portion 32B. The tubing system 34 can be constructed of rigid, semi-flexible or flexible material, such as metal, plastic or elastomers or combinations thereof. In accordance with an exemplary embodiment of the invention, the tubing sections 110, 112 and 114 are constructed of a Teflon™ material with a polyester overbraid to protect the tubing from damage. Stainless steel fittings may be used to connect the tubing sections to the rest of the system. It will be understood that the materials for the tubing sections and the fittings can greatly vary and utilization of any conventional material is within the scope of the invention.

Figure 1:
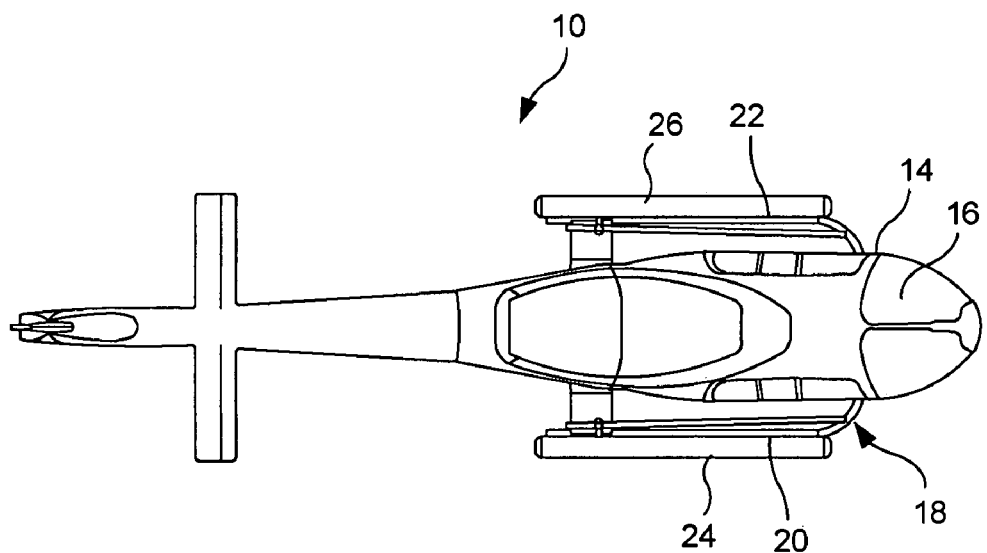
FIG. 1 is a top plan view of a rotorcraft employing the pressurized actuator system of the present invention with a pair of flotation devices in an undeployed state.
Figure 2:
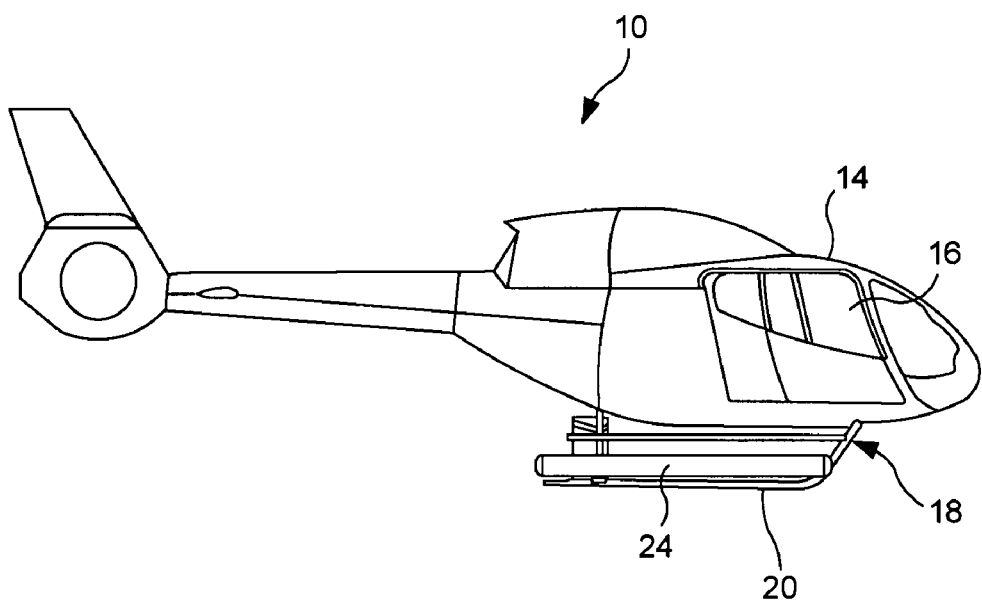
FIG. 2 is a side elevational view of the rotorcraft of FIG. 1 with the flotation devices in the undeployed state.
Figure 8:
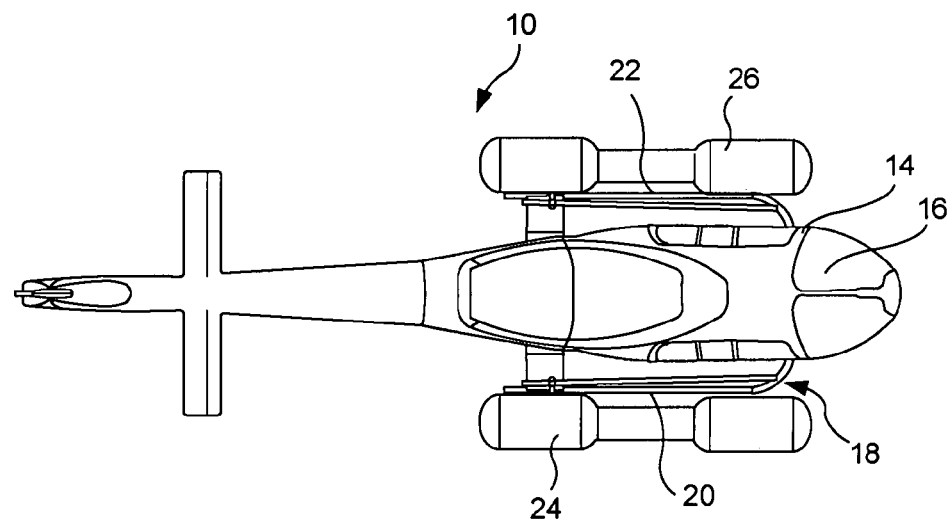
FIG. 8 is a top plan view of the rotorcraft employing the pressurized actuator system of the present invention with the pair of flotation devices in a deployed state.
Figure 9:
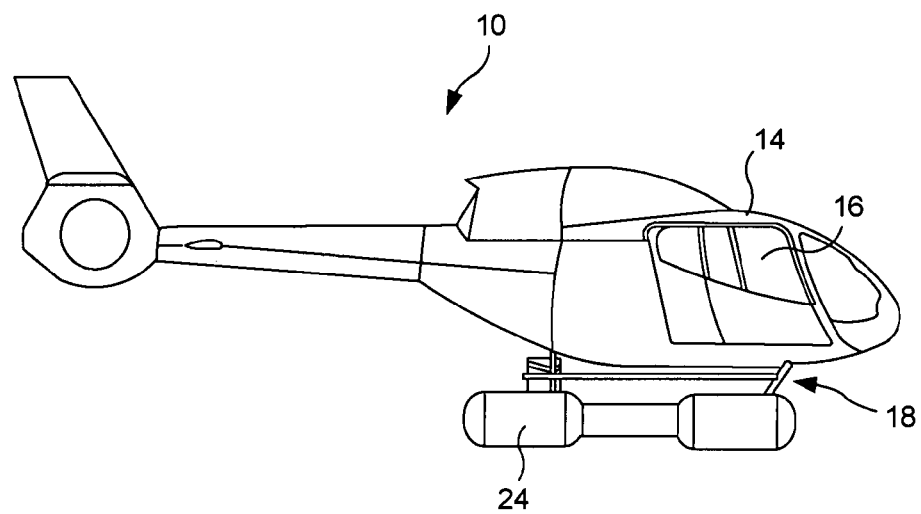
FIG. 9 is a side elevational view of the rotorcraft of FIG. 8 with the pair of flotation devices in the deployed state.

In use, the inflatable flotation devices and life rafts are initially stored in a compressed undeployed condition, as shown in FIGS. 1 and 2, and in phantom line in FIG. 5. As best illustrated in FIG. 3, in this position, the lever or arm 40 is in the fully forward position and the secondary container 54 is undisturbed. Accordingly, in this initial condition the fluid pressure in the tubing system 34 is minimal and little or no pulling force is exerted on the link arm 106 and on the primary valve actuator 96, as best illustrated in FIG. 5. When the lever arm 40 is pulled toward the control arm 44 with sufficient force to break the shear pin 74 (FIGS. 3 and 4), either manually by a pilot or other person or automatically through well-known mechanisms, the puncture shaft 62 is forced forward until the puncture tip 64 pierces the cap 60 of the secondary container 54. As shown in FIG. 3, when the lever arm is released, the spring 66 will force it back to the forward position and fluid under pressure will be discharged into the first, second and third tubing sections 110, 112 and 114, respectively. With the outlet 115 of each tubing section 112 and 114 positioned forward of the piston head 102, the piston is forced rearwardly into the cylinder to thereby pull the shaft 104 and link arm 106 associated therewith sufficient force to activate the primary valve actuator 96 (FIG. 5). A vent hole 120 is provided in each cylinder 98 rearwardly of the piston head 102 for facilitating piston movement. Eventually, the forward end of the link arm 106 breaks free of the primary valve actuator 96 and the pressurized fluid from the primary container 86 is discharged into its respective inflatable flotation device 24, 26 through the primary nozzle 90 to thereby inflate the inflatable devices, as shown in FIGS. 5, 8 and 9.

The pressure required to force the pistons 100 rearwardly and activate the primary valve actuators 96 will depend on the type of primary container and valve used, as well as the size and configuration of the primary transducer 82. By way of example, a force of approximately 20-30 lbs may be required to activate the primary valve actuators 96 of the deployment portion of 32A. For a primary container having a diameter of about 0.75 inch, an applied pressure of about 75 psi should be sufficient. It will be understood that the ranges of pull forces for opening the valves of the primary and secondary cylinders are given by way of example only, and may vary greatly depending on the size of the cylinders, the type of valves used, the size of the structure(s) to be inflated, the presence or absence of a vacuum force, as well as other factors.

Figure 6:
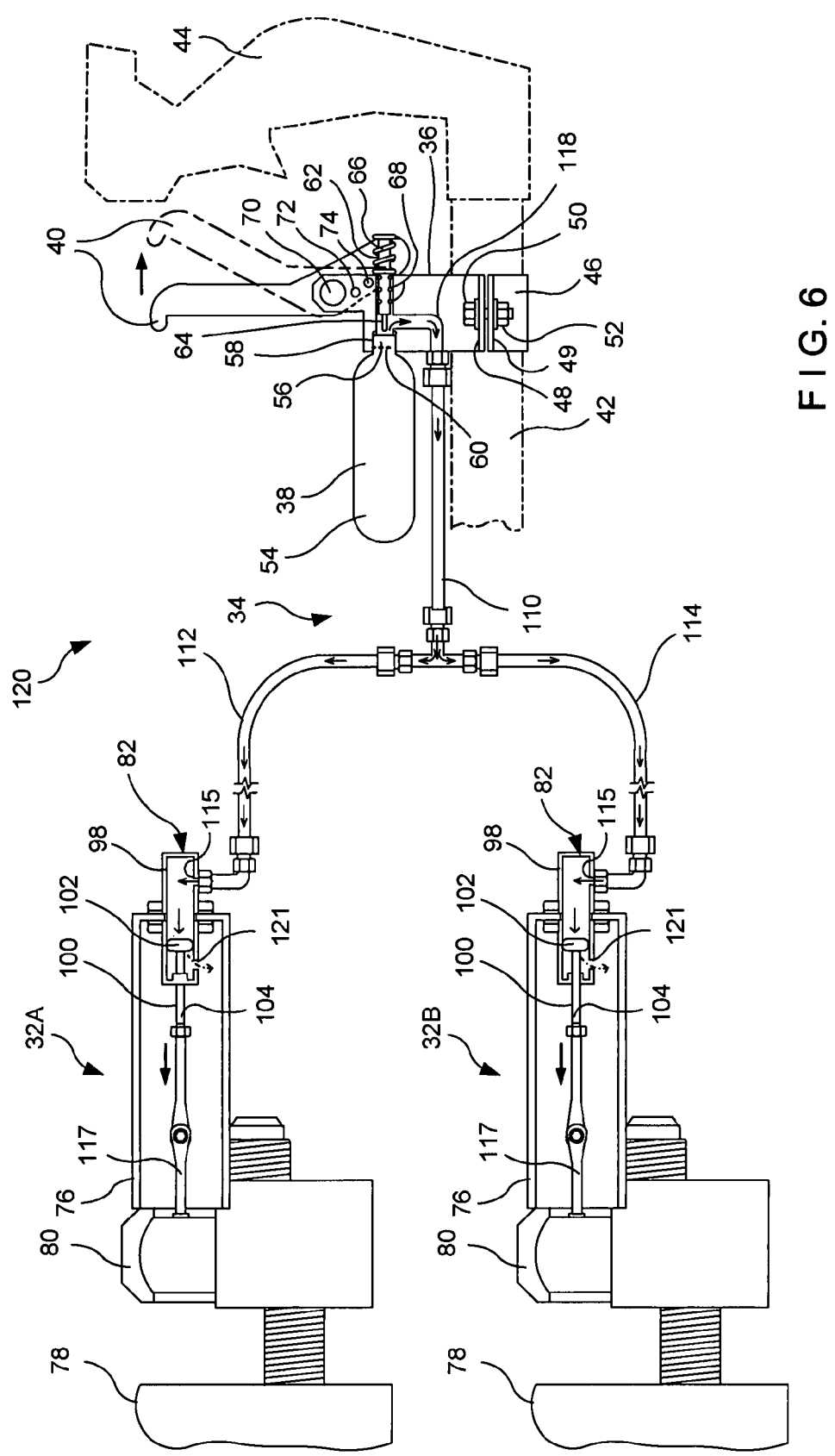
FIG. 6 is a schematic view of a pressurized actuator system in accordance with further embodiment of the present invention.

Turning now to FIGS. 6 and 7, a pressurized actuator system 120 in accordance with a further embodiment of the invention is illustrated. The actuator system 120 is similar in construction to the actuator system 12 previously described, with the exception that the flexible link arm 106 is replaced with a solid link arm 117 and the outlet 115 of each tubing section 112 and 114 is positioned on the cylinder 98 rearward of the piston head 102. When the secondary source of pressurized fluid or the secondary container 54 is activated, as previously described, the piston 100 is forced forwardly out of the cylinder to thereby push the link arm 117 with sufficient force to activate the primary valve actuator 96 (FIG. 7). The primary valve actuator 96 may be of the well known type that releases fluid under pressure when punctured or otherwise breached. Thus, a puncturing instrument (not shown) may be associated with the primary valve actuator 96 and responsive to forward movement of the link arm 117. As best illustrated in FIG. 6, the vent hole 121 is provided in each cylinder 98 forwardly of the piston head 102 for facilitating piston movement.

One of the unique advantages of the above-described actuator systems is that on inflatable flotation devices and a respective life raft can be independently and contemporaneously deployed without increasing the actuation force that must be applied to the actuator or arm lever 40. This arrangement allows the tubing system 34 to be mounted anywhere throughout the aircraft. In the present system the difference in the lengths of the tubing sections 112 and 114 will not affect the deployment of the inflatable flotation device 24, 26 and the respective life raft.

In addition, only a manual or automatic secondary pull force of approximately 15 to 20 pounds is needed to break the shear pin and move the actuator lever 40 in the direction to puncture the cap 60 of the secondary container 54 to generate the primary pull force needed on the link arms 106 or 117 to actuate the primary valves 80 and inflate the flotation devices 24 and 26 as well as the respective life rafts. In this manner the system of the Invention provides an inherent safety feature which provides deployment of the secondary inflatable unit such as a life raft only after the primary inflatable unit such as inflatable float has been deployed. Thereby, a possibility of deploying the life raft either in-flight or during ground maintenance operations has been eliminated. Thus, pilots or other personnel and/or automatic triggering means can activate the actuator system 12 with minimal effort, resulting in an actuator system that is easier to use and more reliable in operation. Moreover, the actuator systems of the present invention is more beneficial compared to the known solutions since the systems of the invention substantially reduce or eliminate damage to adjacent components as often occurs in the prior art mechanical arrangements.

Figure 10:
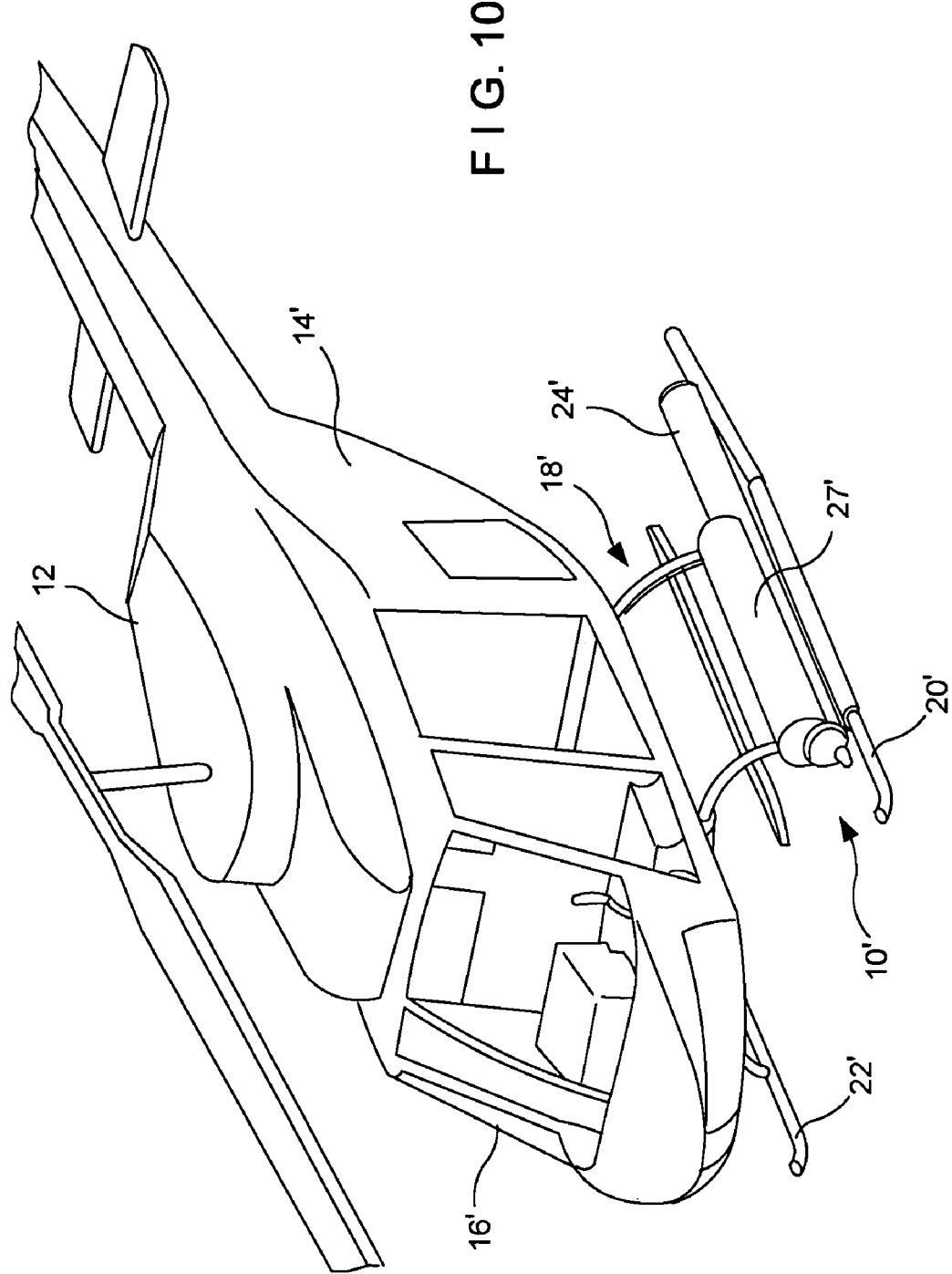
FIG. 10 is a view of the rotorcraft showing the floatation device and the life raft.
Figure 11:
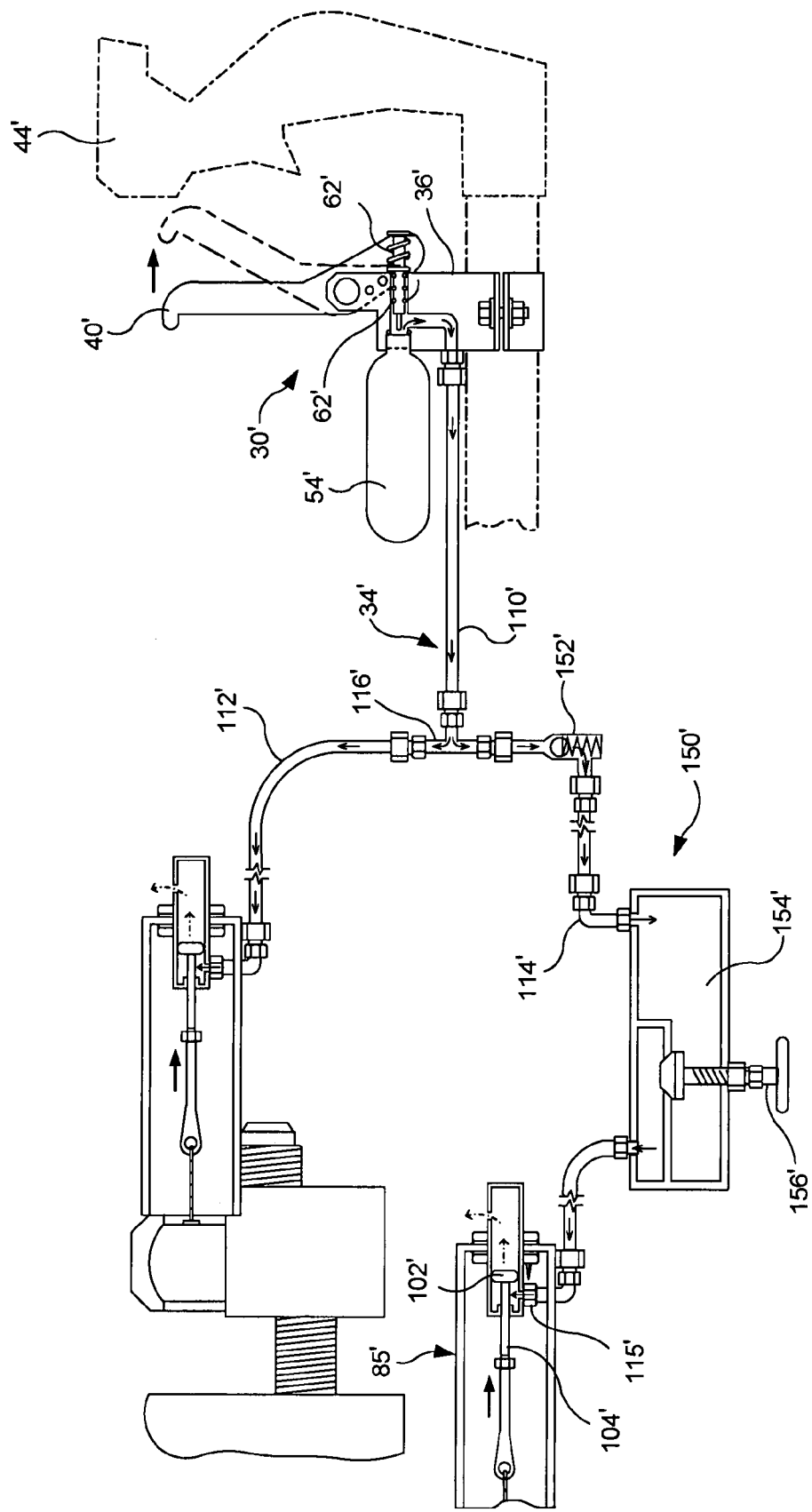
FIG. 11 is a schematic view of the pressurized actuator system in accordance with a further embodiment of the present invention.

Referring now to FIGS. 10 and 11 a rotorcraft or helicopter 10' employing a pressurized actuator system in accordance with another embodiment of the present invention is illustrated. The rotorcraft 10 includes a main body 14' with a cockpit 16', a landing structure 18' having a first landing skid 20' and a second landing skid 22' which extend along a longitudinal axis of the rotorcraft and are in contact with the ground when not in flight. The inflatable flotation devices 24' and life rafts 27' are associated with the respective landing skids.

Referring now to FIG. 11, similar to the above discussed arrangements this embodiment of the pressurized actuator system consists of the tubing system 34' which includes a main tubing section 110' which is connected to a primary tubing section 112' and a secondary tubing section 114' through a diverting member or T-shaped connector 116'. The main tubing section 110' is associated with the activating mechanism consisting of the arm 40', secondary container 54', etc. in a manner discussed hereinabove. Significantly, in this embodiment a single activating mechanism is utilized for deployment of the primary inflatables or floats as well as the secondary inflatables or the life rafts. The primary tubing section 112' extends between the diverting member or T-shaped connector 116' and the cylinder 98' of the primary transducer 82' associated with the deployment mechanism of the primary inflatables or floats. In a similar manner, the secondary tubing section 114' extends between the T-connector 116' and the control valve assembly 150' which is in turn connected with the cylinder of the transducer adapted for deployment of the secondary inflatable or life raft.

The control or secondary valve assembly 150' typically consists of a check valve 152' positioned up stream of an accumulation chamber or accumulation device 154' and a controlling device or release valve 156' positioned downstream of the accumulation chamber. The check valve 152' is provided to assure a unidirectional flow of the pressurized fluid or pressurized $CO_2$ gas within the secondary tubing section 114'. In this manner, the stream of pressurized fluid upon entering the secondary tubing section 114' and the accumulation device or chamber 154 through the check valve 152' does not return to the portions of the tubing network disposed upstream of the control valve assembly 150'. The accumulation device 154' can be in the form of accumulation chamber, valve having a substantial internal space or any other conventional arrangement capable of receiving and accumulating the pressurized fluid passing through the upstream area of the secondary tubing section 114'. It is an essential requirement for the accumulation device 154' to collect and accumulate a predetermined volume of pressurized fluid, so as to store enough energy in the system for activation of the life raft air cylinder. The controlling device or release valve 156' is adopted to control further movement of the pressurized gas within the secondary tubing section, downstream of the accumulation device 154', so as to be ultimately directed to the respective cylinders for activation of the life raft. The controlling device or valve 156' can be of any conventional construction and can be activated manually, electrically or by any other conventional means. For example, the device 156' can be in the form of a safety pin provided at a downstream portion of the accumulation device 154'.

In use, upon landing, the inflatable flotation devices, such as floats and life rafts, are initially stored in a compressed undeployed condition. The lever or arm 40' of the activating mechanism is initially in the fully forward position and the secondary container 54' is undisturbed. When the lever arm 40' is pulled by a pilot toward the control arm 44', the puncture shaft 62' is forced forward so as to pierce the secondary container 54' causing discharge fluid under pressure into the main, primary and secondary tubing sections 110', 112' and 114', respectively. As the pressurized fluid flows through the diverting member 116' or any other arrangement capable of performing similar function, it branches off, so that a portion thereof is directed to the primary tubing section 112' and ultimately to activate the primary inflatables. The remaining portion of the pressurized fluid flow is directed to the secondary tubing section 114'. Upon passing through the check valve 152' the pressurized fluid enters the accumulation device 154' for accumulation and storage. It remains there until a later time when a pilot is ready for deployment of the secondary inflatable through activation of the controlling device 156'. During the initial stages of the deployment the accumulation device 154' is in a closed position and is isolated from the down stream area of the secondary tubing 114'. At that stage of operation, the pressurized fluid can not penetrate to the primary valves of the secondary inflatable. Such accumulated pressurized fluid is not released into the downstream portion of the secondary tubing 114' until an additional operation is performed by a pilot by activating the controlling device 156'. In this manner the pressurized fluid, which is stored and accumulated in the accumulation device or chamber 154', is released into the downstream portion of the secondary pneumatic tubing network. In the secondary inflatable pneumatic circuit, the downstream outlet 115' of the secondary tubing section 114' is properly positioned with respect to the piston head 102', so that the piston is forced within the cylinder 98' to thereby pull the shaft 104' and other arms and members associated with the secondary transducer 85' with sufficient force. In this manner, the secondary valve is activated to thereby inflate the respective secondary inflatable device such as a life raft.

The system of the embodiment of the invention illustrated in FIGS. 10 and 11 allows to utilize the same activating or trigger mechanism for deployment of the primary and secondary inflatable devices. This minimizes a possibility of the pilot error and prevents undesirable simultaneous deployment of the primary and secondary inflatables. Furthermore, it also prevents deployment of the secondary inflatable prior to the deployment of the primary inflatable. An essential feature of the invention is that during landing the downstream region of the accumulation device 154' is initially closed. Thus, the pressurized fluid can not penetrate into the area of the secondary tubing network 114' below the secondary valve arrangement 150' until a further procedural step is carried out by the pilot. This means that the secondary inflatable can not be deployed until the controlling device 156' is activated. By providing a single trigger or activating mechanism and the secondary valve assembly 150' the system of the invention adds an important safety feature to the deployment procedure. Thus, in the system of the invention the secondary inflatable or life raft is deployed only after the floats or primary inflatable have been activated. Thus, the deployment system of the invention minimizes the human error possibility and prevents the ability of the pilot to pull the wrong lever causing premature, undesirable deployment of the secondary inflatable.

It will be understood, therefore, that this invention is not limited to the particular embodiments disclosed, but is intended to cover modifications within the spirit and scope of the present invention as defined by the appended claims. It will be appreciated by those skilled in the art that changes could be made to the embodiments described above without departing from the broad inventive concept thereof. For example, although the deployment of inflatable devices has been described for use with rotorcrafts, it will be understood that the deployment system of the present invention can be used for other aircraft, as well as other movable or stationary structures. The system of the invention can be utilized in many applications where controlled deployment of multiple inflatable devices is required. It will be further understood that the inflatable devices adapted for use with pressurized actuator system of the invention can be in the form of emergency evacuation devices such as slides and rafts, as well as swimming pools, temporary shelters, or any other inflatable structures. Furthermore, it should be clear that the actuator system of the invention is applicable for actuation of practically any type of inflatable structures remotely positioned from an operator.

What is claimed is:

1. A pressurized actuator system for independently deploying a plurality of inflatable structures, the system comprising:
   a plurality of primary sources of pressurized fluid adapted for deploying a plurality of inflatable structures;
   a plurality of primary valves, each primary valve being operatively associated with one of the primary sources;
   a plurality of pressure-responsive primary transducers, each primary transducer being operative to open one of the primary valves; and
   a secondary source of pressurized fluid adapted for independently operating the primary transducers to thereby open the primary valves and independently deploy the plurality of inflatable structures; and
   a control assembly for controlling a flow of pressurized fluid from said secondary source of pressurized fluid to said at least one predetermined pressure-responsive primary transducer, so that said predetermined primary transducer is operated independently from said other primary transducers to assure independent deployment of the primary and secondary inflatable structures.

2. A system according to claim 1, wherein said control assembly comprises at least an accumulation device adapted for accumulation of said pressurized fluid directed from said secondary source of pressurized fluid to said secondary inflatable structure.

3. A system according to claim 2, wherein said control assembly further comprises a check valve arrangement provided between said accumulation device and said secondary source of pressurized fluid, so as to assure a unidirectional flow of said pressurized fluid within at least said control assembly.

4. A system according to claim 3, wherein said control assembly further comprises a controlling device provided between said accumulation device and said secondary inflatable structure.

5. A system according to claim 4, wherein upon activation of said controlling device said pressurized fluid accumulated in said accumulation device is released to energize said second pressure-responsive primary transducer causing deployment of said secondary inflatable structure.

6. An aircraft pressurized actuator system for independent deploying of at least two inflatable structures, the system comprising:
   a first primary source of pressurized fluid adapted for deploying a first inflatable structure;
   a first primary valve operatively associated with the first primary source;
   a first pressure-responsive primary transducer operative to open the first primary valve;
   a second primary source of pressurized fluid adapted for deploying a secondary inflatable structure;
   a second primary valve operatively associated with the second primary source;
   a second pressure-responsive primary transducer operative to open the second primary valve;
   a secondary source of pressurized fluid adapted for operating said first and second primary transducers, and
   a control assembly for controlling a flow of pressurized fluid from said secondary source of pressurized fluid to said second pressure-responsive primary transducer, so that said second primary transducer is operated independently from said first primary transducer to assure independent deployment of the primary and secondary inflatable structures.

7. A system according to claim 6, wherein said control assembly comprises at least an accumulation device adapted for accumulation of said pressurized fluid directed from said secondary source of pressurized fluid to said secondary inflatable structure.

8. A system according to claim 7, wherein said control assembly further comprises a check valve arrangement provided between said accumulation device and said secondary source of pressurized fluid, so as to assure a unidirectional flow of said pressurized fluid within at least said control assembly.

9. A system according to claim 8, wherein said control assembly further comprises a controlling device provided between said accumulation device and said secondary inflatable structure, upon activation of said controlling device said pressurized fluid accumulated in said accumulation device is released to energize said second pressure-responsive primary transducer causing deployment of said secondary inflatable structure.

10. A system according to claim 6, wherein said secondary inflatable structure is deployed after activation of the primary inflatable structure.

11. A system according to claim 6, and further comprising an actuator for releasing the pressurized fluid from said secondary source of pressurized fluid.

12. A system according to claim 7, wherein said accumulation device is capable of accumulating a predetermined volume of the pressurized fluid capable of energizing said secondary inflatable structure.

13. A system according to claim 9, wherein said controlling device is a release valve adapted to control movement of the pressurized fluid within the actuator system downstream of the accumulation device.

14. A system according to claim 9 wherein said controlling device is a safety valve capable of the activated by a pilot.

15. A system according to claim 14, further comprising a puncture shaft movable in response to movement of the actuator lever for piercing the secondary source and releasing the pressurized fluid.

16. A system according to claim 15, and further comprising an actuator arm for releasing the pressurized fluid from the secondary source.

17. A system according to claim 6, further comprising at least a main and secondary tubing sections, fluidly connected to the secondary source of pressurized fluid, wherein said secondary tubing section provides fluid communication between said main tubing section and said control assembly.

18. A system according the claim 17, further comprising a primary tubing section providing fluid communication between said main tubing section and said first primary valve and said first pressure responsive primary transducer.

19. A system according to claim 17, wherein said control valve assembly is provided within said secondary tubing section upstream of said second primary valve.

20. A system according to claim 6, wherein the second pressure-responsive primary transducer comprises at least a cylinder, a piston head provided for movement in the cylinder and a piston element connected to the piston head for movement therewith, the piston element is adapted to operate the second primary valve actuator when the pressurized fluid from the secondary source activates the piston head, so as to deploy the secondary inflatable structure.

* * * * *